United States Patent
Epple

(10) Patent No.: US 7,196,815 B2
(45) Date of Patent: Mar. 27, 2007

(54) REPRODUCTION METHOD FOR PRINTING

(75) Inventor: Rudolf Epple, Augsburg (DE)

(73) Assignee: Epple Druckfarben AG, Neusaess-Augsburg (DE)

( * ) Notice: Subject to any disclaimer, the term of this patent is extended or adjusted under 35 U.S.C. 154(b) by 1074 days.

(21) Appl. No.: 10/083,345

(22) Filed: Feb. 27, 2002

(65) Prior Publication Data

US 2002/0122081 A1 Sep. 5, 2002

(30) Foreign Application Priority Data

Mar. 1, 2001 (DE) ............................ 101 10 736
Oct. 31, 2001 (DE) ............................ 101 54 655

(51) Int. Cl.
*H04N 1/40* (2006.01)
*H04N 1/60* (2006.01)

(52) U.S. Cl. ..................... 358/1.9; 358/3.01; 358/3.02; 358/518

(58) Field of Classification Search ............... 358/1.1, 358/1.9, 3.01, 3.02, 501, 518, 519, 521
See application file for complete search history.

(56) References Cited

U.S. PATENT DOCUMENTS

| | | | | |
|---|---|---|---|---|
| 5,055,923 A | * | 10/1991 | Kitagawa et al. | ............ 358/534 |
| 5,309,246 A | | 5/1994 | Barry et al. | ................. 358/298 |
| 5,748,858 A | | 5/1998 | Ohtsuka et al. | ............. 395/109 |
| 5,946,454 A | | 8/1999 | Shu et al. | ................... 395/109 |

FOREIGN PATENT DOCUMENTS

| | | |
|---|---|---|
| DE | 696 08 842 T2 | 1/2001 |
| EP | 0 370 271 A2 | 5/1990 |
| EP | 0 417 806 A2 | 3/1991 |
| EP | 0 417 806 A3 | 3/1991 |
| EP | 0 533 593 A2 | 3/1993 |
| EP | 0 538 901 A2 | 4/1993 |
| EP | 0 687 102 A2 | 12/1995 |
| EP | 0 538 901 B1 | 5/1998 |
| EP | 0 859 507 A2 | 8/1998 |
| EP | 0 734 151 B1 | 6/2000 |
| JP | 10035128 A * | 2/1998 |
| WO | WO 01/91453 | 11/2001 |

OTHER PUBLICATIONS

Printed Publication, "Offset Printing", extract from "*Getting It Printed*" by M. Beach, revised edition, Mar. 1999.
Printed publication, "*Philosophy of Color Management, Postscript Color Management*", by S. Brües, L. May and D. Fuchs, 2nd edition, Feb. 2000.
Printed publication, "*Color Management: Current Practice and The Adoption of a New Standard*" by M. Has and T. Newman, Jul. 30, 2000 (Partial Translation).
European Search Report dated Feb. 26, 2003.

* cited by examiner

*Primary Examiner*—Thomas D. Lee
(74) *Attorney, Agent, or Firm*—Lipsitz & McAllister, LLC

(57) ABSTRACT

To provide a reproduction method for printing wherein characteristic data of an original are transformed into data required for printing, with the dot gain being controllable so as to yield optimum reproduction results in the print, it is proposed that a modified characteristic curve of printing which in relation to the ideal characteristic curve of printing has a maximum above an area coverage of 50% be predefined for the transformation of the data in order to control the dot gain in printing.

33 Claims, 2 Drawing Sheets

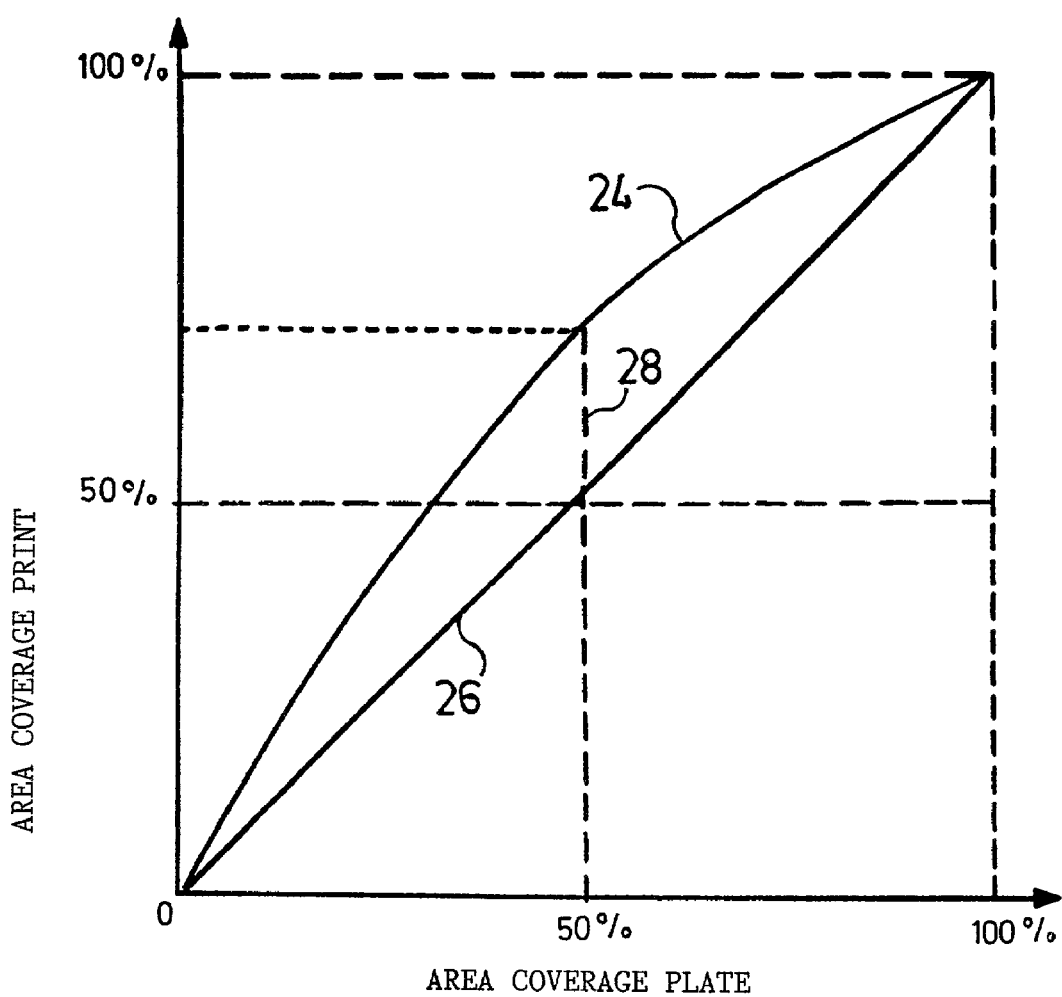

REPRODUCTION METHOD FOR PRINTING

RELATED APPLICATIONS

The present disclosure relates to the subject matter disclosed in German applications No. 101 10 736.6 of Mar. 1, 2001 and No. 101 54 655.6 of Oct. 31, 2001, which are incorporated herein by reference in their entirety and for all purposes.

FIELD OF THE INVENTION

The invention relates to a reproduction method for printing in which characteristic data of an original are transformed into data required for printing.

BACKGROUND OF THE INVENTION

In reproduction methods for printing a color proof is usually made, for example, from a slide using corresponding color filters. The color space associated with a scanner is an RGB color space with the process colors red (R), green (G) and blue (B). During the printing, for example, offset printing, the color proofs are screened. The color impression in offset printing is based on autotypical color synthesis, i.e., on a combination of additive color synthesis and subtractive color synthesis. The process color space of the printing inks is usually a CMYK color space in which the process colors are cyan (C), magenta (M), yellow (Y) and black (K).

The resulting print should naturally be as close as possible to the original, i.e., the quality and color fidelity of the image reproduction in the print should be as high as possible.

During the printing itself, a specific problem occurs in that mechanical influences cause ink dots to be squeezed, for example, in offset printing during transfer from the offset plate to the rubber blanket and then again during transfer from the rubber blanket to paper. A printed screen dot is then enlarged during the printing operation, i.e., it has a larger dot area than was actually provided for by the transformation from the original to the data required for printing. In principle, dot gain is an undesired and annoying effect which may affect the color reproduction in the print. The effect of dot gain may result in color distortions in the print in comparison with the original.

The effect of dot gain is indicated by a so-called characteristic curve of printing (printing characteristics) in which the area coverage in the print is shown with respect to the area coverage in an original with a colored application, for example, a film or a plate. Without dot gain, the characteristic curve of printing would be a straight line which represents a line bisecting the angle between ordinate (area coverage in the print) and abscissa (area coverage in the original with a colored application).

In the publication "PHILOSOPHIE DES COLOR MANAGEMENT; Postscriptum Color Management" by S. Brües, L. May and D. Fuchs, LOGO GmbH, $2^{nd}$ edition, February 2000, reproduction processes are described against the background of color management.

The object underlying the invention is to provide a reproduction method for printing in which the dot gain is controllable so as to obtain optimum reproduction results in the print.

SUMMARY OF THE INVENTION

This object is accomplished in accordance with the invention in that a modified characteristic curve of printing which in relation to the ideal characteristic curve of printing has a maximum above an area coverage of 50% is predefined for the transformation of the data in order to control the dot gain in printing.

The modified characteristic curve of printing can be represented by plotting the dot gain (in percent) against the area coverage in percent of the plate or film.

In this representation the abscissa (the 0% line of the dot gain) is the ideal characteristic curve of printing.

In accordance with the invention, a modified characteristic curve of printing or a modified dot gain is predefined, which is not based on experimental values, but is theoretically predefined. To date, it is common practice to determine experimental printing characteristics and to then take these into account in the transformation. However, the actual printing characteristics (characteristic curve of printing) differ from printing machine to printing machine and are dependent upon the quality of the printing inks used and also upon the type of paper on which the printing is done. The determining of the printing characteristics (characteristic curve of printing) in each case involves considerable expenditure.

In accordance with the invention provision is made for the maximum of the modified characteristic curve of printing in relation to the ideal characteristic curve of printing to lie above an area coverage of 50% and, in particular, to lie at an area coverage of between 50% and 70%. Very good results have been obtained when the maximum of the modified characteristic curve of printing in relation to the ideal characteristic curve of printing lies at approximately 60% area coverage. These good results are, above all, due to the fact that in modern reproduction processes screen dots do not have a square cross section but are, for example, substantially circular. This is also the reason why in the printing of all screen dots of a screen, there is not total area coverage, i.e., there is not 100% area coverage. The maximum should lie in a range where neighboring screen dots start to overlap. This is the case when an area coverage of more than 50% is reached.

Theoretically, circular dots on an area on which they are arranged like a checkerboard start to overlap at an area coverage of approximately 78% ($\pi/4 \cdot 100\%$). If a dot gain of approximately 10% to 25% is also taken into account the maximum should then lie at approximately 60% area coverage.

As theoretical ansatz for the characteristic curve of printing, a zero crossing may lie at a finite value of the area coverage, i.e., in particular, outside an area coverage of 0% and/or an area coverage of 100%. The modified characteristic curve of printing in the range of low area coverages from zero area coverage to the corresponding zero crossing thus corresponds to the ideal characteristic curve of printing and alternatively or additionally in the range of high area coverages from the zero crossing to 100% area coverage to the ideal characteristic curve of printing. In particular, this ansatz is based on the observation that at low area coverages a higher color fidelity is achieved when the modified dot gain is not set too high. This is due to the fact that in the case of small area coverages, the printed dots are small and so the dot gain is presumably of less importance. An unsuitable compensation attempt can then cause much stronger color deviations than the renunciation of compensation in accordance with the invention or a reduction in the compensation in the case of very small area coverages. In the case of very small area coverages (less than 3%) it is also very difficult to print dots from a mechanical viewpoint insofar as the printing is performed with damping in the offset process. For this reason, too, it is therefore expedient not to carry out any modification below this area coverage limit.

Furthermore, the modified characteristic curve of printing is based on the observation that the modified dot gain is also to be set lower in the case of high area coverages. One reason for this, at least for the range of high area coverages, is probably that in modern reproduction processes corresponding screen dots are circular, so that from an area coverage of more than approximately 60% on neighboring screen dots start to overlap and also in the printing of all screen dots of a screen, the area coverage is not complete, i.e., does not correspond to a 100% area coverage. As it is difficult to keep small dots open in a complete color area, here, too, an unsuitable compensation can result in stronger color deviations than no compensation at all. The above difficulties occur, in particular, in offset processes with damping.

The modified characteristic curve of printing is a continuous and, in particular, continuously differentiable curve or predefined values which can be interpolated by such a curve. It is, however, advantageous for the curve to have a first monotonic range in which the modified dot gain starts from the zero point at low area coverage, increases towards a maximum and from this maximum decreases towards the zero point at high area coverage.

Owing to the fact that a modified—i.e. theoretical or hypothetical—characteristic curve of printing is predefined, this characteristic curve of printing has only few, quickly adjustable parameters. Even if an original is to be printed on different printing machines, the characteristic curve of printing does not have to be experimentally determined each time for each printing machine, but instead the modified characteristic curve of printing in accordance with the invention is predefined, and the available parameters are set so as to yield optimum results. An additional precondition may, however, be that, for example, the modified characteristic curve of printing in relation to the ideal characteristic curve of printing (the modified dot gain in relation to the area coverage of the original with a colored application) has a zero crossing at a finite area coverage, i.e., outside 0% and/or 100%.

The reproduction method for printing in accordance with the invention can be advantageously used for printing with printing inks which have a high density in the print, and, in particular, have a density which so far has not been customary in offset printing. Such increased densities are achieved by increased concentrations of pigment in the printing inks and also by a higher application of ink. This, in turn, means an increased layer thickness and therefore an increased dot gain, as, in principle, a thicker layer of printing ink can also undergo deformation to a greater extent (be squeezed out further) than is the case with a thinner layer of printing ink. Printing inks for printing at a higher density are described in DE 100 03 071 A1 and in EP 1 120 445 A2, to which reference is hereby expressly made.

A corresponding set of printing inks comprises the color tones yellow, red or magenta, cyan and black, and the difference of the optical density (logarithm of opacity) of the printing ink in the color tone black from the density of the printing ink in the chromatic tone with the highest density in the print is approximately 0.5. It has been found that use of printing inks where there is this difference value results in density ranges of 2.2 and higher. This 0.5 value is presumably determined by the physiological properties of the human ability to see colors, i.e., in particular, by the arrangement and formation of the rods and cones in the eye and by the signal processing in the brain. It seems that this value is universal. In a variant of an embodiment, the color tone of the chromatic color with the highest density is cyan.

Furthermore, provision may be made for the difference of the optical density between chromatic colors with neighboring density values to be 0.1 or, if this difference is larger, to lie as close as possible to 0.1. This 0.1 value also seems to be determined by the properties of the human system of seeing colors. With correspondingly produced printing inks a high density range is then achievable in printing. It may happen that in the case of a high density of a printing ink, if the difference value of 0.1 was selected, a process color tone cannot be distinguished by the human eye from identical color tones with lower density values. For example, a yellow color tone with a density of 2.3 cannot be distinguished from one with the value 2.0. In such a case, it is therefore expedient to diverge from the above rule in order to keep the production costs of the printing ink low and to facilitate handling during the printing. The difference should then be selected as close as possible to a value of 0.1.

In order to achieve a high density range it is particularly advantageous for the optical density of the printing ink in the color tone black to be at least 2.3.

Printing inks are usually made from a mixture of a binder, a colorant and printing additives. In a first embodiment of a set of printing inks, the aforesaid preconditions are met. In particular, the colors are advantageously produced by the proportion of colorant lying as proportion of pigment in the range of between 10% and 30% in the printing ink. The binder advantageously comprises phenol-modified colophony resin dissolved in oils such as mineral oil, vegetable oils or derivatives thereof.

The set of printing inks according to the first embodiment with a density range of up to 1.9 meets the German Industrial Standard 16539 relating to a color scale for offset printing. The corresponding colors are also referred to as Euroscale. The inventive set of printing inks can therefore be used both "conventionally" at a lower density range and at a higher density range.

In a second embodiment of such a set of printing inks, the proportion of colorant advantageously lies as proportion of pigment in the range of between 15% and 40%. Modified phenol resin in oil is used as binder. Mineral oil, vegetable oil or derivatives thereof can be used as oil.

With such a set of printing inks one obtains on account of the high proportion of pigment a very high density range which can be 2.4 or more. Density ranges of 2.8 to 3.0 have already been achieved.

It is expedient for the modified characteristic curve of printing in relation to the ideal characteristic curve of printing to correspond to the dependence of a modified dot gain upon the area coverage of an original with a colored application. The modified dot gain is not a real—experimentally measured—dot gain, but an externally predefined hypothetical—theoretical—dot gain.

In particular, it is advantageous for the zero crossing of the modified characteristic curve of printing at low area coverages to lie in the range of between 3% and 30% area coverage, and, advantageously, to lie at area coverages of between 5% and 25. The modified dot gain in the range of low area coverages is thereby reduced.

It has also proven advantageous for the zero crossing of the modified characteristic curve of printing in relation to the ideal characteristic curve of printing at high area coverages to lie in the range of between 90% and 98% area coverage, and, in particular, in the range of between 95% and 98% area coverage. As a result of this, reproductions with color fidelity in the print have also been achieved at high area coverages.

Very good results have been achieved when the zero crossing of the modified characteristic curve of printing at low area coverage has a flatter slope than the zero crossing at high area coverage. Printed reproductions of originals with high color fidelity have thereby been obtained. With low area coverages, the printed dots are smaller in size and the dot gain should not be overcompensated. As the area coverage increases, the compensation should gradually increase. With large area coverages, on the other hand, dots are printed over one another (in the case of square screen dots this partially occurs at overlapping ends), which results in a "negative" screen. There should then be a steeper drop in the dot gain compensation in order to keep the influence of this negative screen low.

In particular, the slope of the zero crossing at low area coverage lies in the range of between 20° and 30° and the slope of the zero crossing at high area coverage in the range of between 25° and 35°.

It is particularly advantageous for the modified characteristic curve of printing to be predefined by a mathematical function. A suitable transformation of data relating to the original to data for the printing is then quickly achievable with such a function containing few clear parameters, and, where appropriate, an adaptation can be carried out using one or several of the parameters of the predefined mathematical function in order to optimize the printing results with respect to color fidelity.

In practice, excellent results have been obtained when the predefined mathematical function comprises several and, in particular, two arcs of a circle. An arc of a circle has further parameters which are predefined by the position of the center point of the circle forming the arc of a circle and by the radius of the circle forming the arc of a circle and which are correspondingly adjustable. In the case of one arc of a circle there are then three parameters which are adjustable (on the additional condition of generation of a continuously differentiable curve of the modified characteristic curve of printing). This is clear and easy for the operator to carry out. In particular, it is also possible for the modified characteristic curve of printing to be made up of two arcs of a circle so as to obtain different slopes at the zero crossings of low area coverage and high area coverage.

It is also possible for the predefined mathematical function to be one or several arcs of an ellipse, a parabola or a hyperbola.

In addition to predefining the zero positions of the modified dot gain in relation to the area coverage of the original, the modified absolute size of the dot gain (the theoretical maximum size of the dot gain) also plays a part in obtaining a reproduction with color fidelity. It has been found that good results are achieved when the modified characteristic curve of printing in relation to the ideal characteristic curve of printing has a maximum percent dot gain which is less than 30%. Very good results have been obtained, in particular, also for printing inks with high density in the print, when the maximum percent dot gain lies in the range of 5% to 30%, and, for example, at 10%.

Furthermore, very good printing results are achieved when a modified black color characteristic curve of printing is used for black in the print, i.e., when a modified characteristic curve of printing separate from the other color tones (chromatic color tones) is used. It has proven advantageous in printing at higher density for the standard density of black to have a certain density difference of, for example, 0.5 relative to the chromatic printing colors. This is disclosed in DE 100 03 071 A1 and EP 1 120 445 A2, to which reference is hereby expressly made. The difference of the density of black in the print from the density of the chromatic colors can then be taken into account by a modified characteristic curve of printing of its own. Accordingly, it is expedient to use a modified chromatic color characteristic curve of printing of its own or modified chromatic color characteristic curves of printing separated according to the chromatic colors for the chromatic colors.

The inventive process has produced excellent reproduction results, in particular, for printing with printing inks with increased density in the print. In printing with increased density, the printing inks are applied with an increased layer thickness, so that there is also the possibility of stronger deformation here and the problem of dot gain is thus intensified. By predefining a modified characteristic curve of printing in accordance with the invention this increased dot gain can be compensated to such an extent that excellent printing results are obtained.

In particular, good results have been obtained when the standard density in the print in the case of the printing ink with the lowest density lies at least at approximately 1.6.

It is advantageous to use a CMYK set of process colors for the printing.

Particularly good results were achieved for high printing densities when, for example, the standard density in the print with the printing inks in the color tone yellow (Y) lies at approximately 2.0, in the color tone magenta (M) at approximately 2.4, in the color tone cyan (C) at approximately 2.5, and in the color tone black (K) at approximately 3.0.

In particular, printing inks made from a mixture of a binder, a colorant and printing additives, in which the proportion of the colorant in a printing ink as proportion of pigment lies in the range of between 15% and 40%, can be used as printing inks with high density in the print. Such printing inks are described in DE 100 03 071 A1 and EP 1 120 445 A2, to which reference is hereby expressly made.

In a variant of an embodiment the transformation from the original to printing data comprises a color space transformation from an RGB color space to a CMYK color space in order, for example, to be able to print with a printing machine an original from a monitor or a slide.

The inventive reproduction method for printing can be used with advantage in offset printing.

It is particularly advantageous for the modified characteristic curve of printing to be entered in a color management system. Adobe Photoshop, for example, is used as such a color management system. (Adobe and Photoshop are registered trademarks of Adobe Systems Incorporated.) Color data are processed by color management systems so that starting from an original a printed reproduction results which corresponds with respect to color to the original. With color management systems a colored reproduction corresponding to the original is also obtainable in modern reproduction environments. Attention is called in this connection to the publication cited at the outset "PHILOSOPHIE UND TECHNIK DES COLOR MANAGEMENT", to which reference is expressly made. Such color management systems often have interfaces via which experimental characteristic curves of printing can be entered. Entering the modified characteristic curve of printing according to the invention in a color management system yields good reproduction results in respect of compensation of the dot gain in a simple way.

It is also important that when the modified characteristic curve of printing is used within the framework of a color management system and individual values are entered, the values lie close enough to ensure that the predefined modified characteristic curve of printing is taken into account. In particular, it is important that at the edges of the curve the values be sufficiently close at the zero crossings as it is there that the dot gain has the greatest influence on the color fidelity.

The following description of preferred embodiments serves in conjunction with the drawings to explain the invention in greater detail.

BRIEF DESCRIPTION OF THE SEVERAL VIEWS OF THE DRAWINGS

FIG. 3 shows a typical characteristic curve of printing and an ideal characteristic curve of printing.

DETAILED DESCRIPTION OF THE INVENTION

Figure 1:
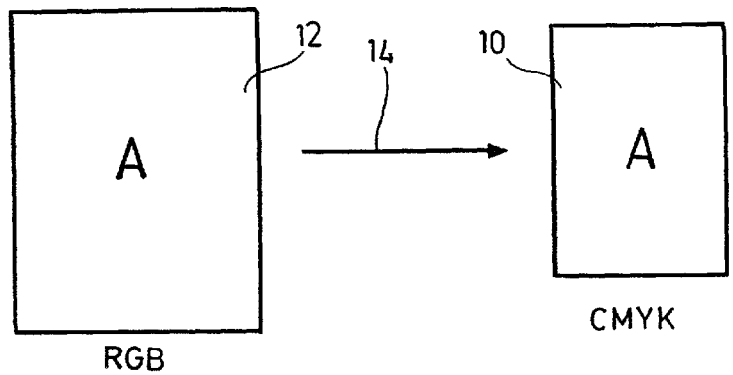
FIG. 1 is a schematic illustration of the reproduction of an original in a print.

To produce a print 10 from an original 12, one proceeds, for example, as shown in FIG. 1, by generating from the original 12, for example, a slide, color separations (color proofs) in an RGB color space containing the process colors red (R), green (G) and blue (B) using a scanner. These data are converted by a transformation 14 into data, for example, of a CMYK color space containing the process colors cyan (C), yellow (Y), magenta (M) and black (K).

Intermediate transformations from RGB to LAB and then from LAB to CMYK may also be performed. In this connection, reference is made to the publication cited at the outset "PHILOSOPIE DES COLOR MANAGEMENT".

Colorimetrically, the transformation represents a unique association of a color space with a reference color system. For example, a corresponding color value from the reference system is associated with each RGB value of a scanner color space. A standard, the so-called ICC (International Color Consortium) standard, applies to the device-independent reference or association color space.

The color transformation can be performed using mathematical models such as, for example, matrix operations or reference tables.

The data file in the CMYK color space is process-specific, for example, there are different data files for intaglio printing, offset printing or screen printing.

In the example of offset printing, the color separations are then screened separately for R, G and B and copied onto an offset plate which, in particular, is formed by a grained zinc plate. In the offset machine, the offset plate is fixed on a plate cylinder and serves to take the printing ink from the ink rollers onto the parts carrying the image. The printing ink is transferred onto the paper via a rubber blanket fixed on a cylinder so as to reproduce the original thereon. The printing inks with the color tones C, Y and M are printed over one another together with a black plate for increasing the contrast.

Figure 2A:
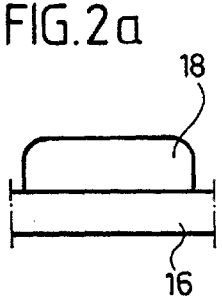
FIG. 2a shows schematically a screen dot saturated with printing ink on an offset plate.
Figure 2B:
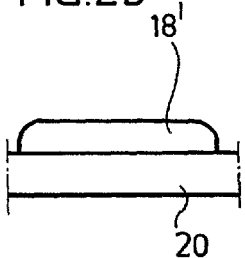
FIG. 2b shows the ink dot after transfer onto a rubber blanket.
Figure 2C:
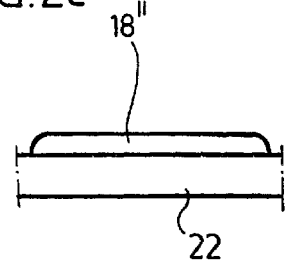
FIG. 2c shows the ink dot after transfer onto the paper in print.

FIGS. 2a, 2b, and 2c show schematically ink dots in the transition from the offset plate onto the paper. FIG. 2a shows an offset plate 16 with an ink dot 18. FIG. 2b shows the same ink dot 18' after transfer onto a rubber blanket 20.

Owing to impression pressures exerted during the transfer from the offset plate to the rubber blanket 20, the ink dot 18' is squeezed, i.e., the dot area of the ink dot 18' increases as a result of the impression pressure to which the layer of ink 18 lying on a screen dot is subjected during the transfer.

Finally, FIG. 2c shows the same ink dot 18" after transfer onto paper 22. Here, too, a further squeezing (dot gain) occurs on account of impression pressures to which the ink dot 18' is subjected during the transfer from the rubber blanket 20 to the paper 22.

The extent of the increase in the dot area of the dot 18" in comparison with the dot 18 on the offset plate 16 depends, aside from the dependence on the impression pressures, in particular, on the amount of ink made available to the offset plate 16 by the ink rollers. The heavier the ink application during printing, the greater is the dot gain that is to be anticipated.

In addition, the dot gain is also dependent upon the condition of the rubber blanket 20, the printing speed, the quality of the printing ink and the quality of the paper on which the printing is done.

FIG. 3 shows the area coverage in the print as a function of the area coverage in the plate. The corresponding curve 24 is referred to as characteristic curve of printing. This shows the dependence of the dot gain on the parameters of the printing process, i.e., as described above, in particular, the impression pressures during the transfer from the offset plate 16 to the rubber blanket 20 and from there onto the paper 22, the condition of the rubber blanket, the printing speed and also the layer thickness. Aside from the density in the print, the characteristic curve of printing 24 thus also depends on the offset printing machine itself. The characteristic curve of printing 24 is usually determined experimentally for a certain printing machine.

Also drawn in FIG. 3 is an ideal characteristic curve of printing 26 in the event there were no dot gain, i.e., if the ink dots 18 on the offset plate 16 were transferable without squeezing as ink dots 18" onto the paper 22.

The dot gain, for example, the dot gain 28 at an area coverage of 50% of the plate, is the difference between the actual characteristic curve of printing 24 and the ideal characteristic curve of printing 26.

The ideal characteristic curve of printing 26 is the line bisecting the angle between abscissa and ordinate (45° straight line).

Figure 4:
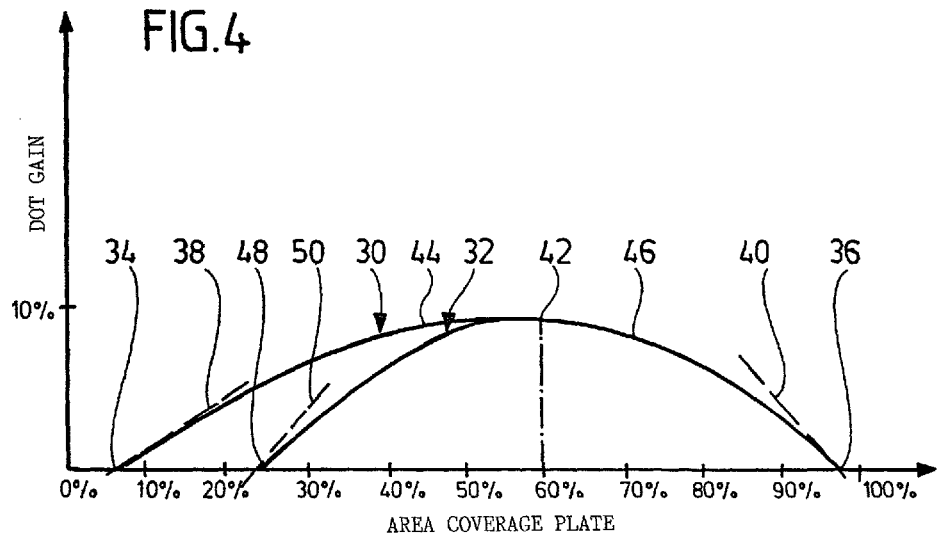
FIG. 4 shows two embodiments of predefined modified characteristic curves of printing as modified dot gain in relation to an area coverage in the plate of the original.

In accordance with the invention, a modified characteristic curve of printing shown with reference to two exemplary embodiments in FIG. 4 is now predefined. The first embodiment of a modified characteristic curve of printing is designated by reference numeral 30 and the second embodiment by reference numeral 32. The two modified characteristic curves of printing have in common that their zero crossings, i.e., their crossings at 0% dot gain, lie at a finite area coverage, i.e., outside 0% and 100%. However, there may also be zero crossings at 0% and/or 100% area coverage (not shown in the drawing).

In the first embodiment 30, the zero crossing 34 of low area coverage lies at approximately 7% area coverage, and the zero crossing 36 of high area coverage at approximately 98% area coverage. This means that the modified dot gain on the basis of the modified characteristic curve of printing 30 is reduced towards zero area coverage in the case of low area coverages, i.e., this is set at a lower value than would, for example, be obtained in accordance with the measured characteristic curve of printing 24 according to FIG. 3. In particular, in the range of area coverage between zero and the zero crossing 34, the dot gain is set at zero (ideal characteristic curve of printing) by the modified characteristic curve of printing.

In the same way, the modified dot gain is reduced towards high area coverages, i.e., towards 100% area coverage, i.e., the dot gain is set at zero between the zero crossing 36 and 100% area coverage.

Furthermore, the modified characteristic curve of printing 30 extends flatter in the area of the zero crossing 34 than in the area of the zero crossing 36 at high area coverages. This is indicated by a corresponding tangent 38 of the modified characteristic curve of printing 30 drawn in broken lines at the zero crossing 34. The tangent 40 at the zero crossing 36 of this modified characteristic curve of printing 30 is also shown. The acute angle of the tangent 38 to the abscissa (which corresponds to zero dot gain) is smaller than the corresponding acute angle between the tangent 40 and this abscissa.

For example, the angle of the tangent 38 to the abscissa lies in the range of between 20° and 30° and the acute angle of the tangent 40 to the abscissa in the range of between 25° and 35°.

In general, the zero crossing 34 lies in the range of between 3% and 30% area coverage and the zero crossing 36 in the range of between 90% and 98% area coverage.

Provision is made in accordance with the invention for the maximum 42 of the modified characteristic curve of printing 30 to be shifted towards high area coverages, i.e., it lies above an area coverage of 50% and, in particular, between an area coverage of 50% and 70%. In the case of the modified characteristic curve of printing 30, this maximum 42 lies at an area coverage of approximately 70%.

The maximum 42, i.e., the maximum percent dot gain lies at an area coverage above 50%. Only in the ideal case when the screen dots are rectangular and, in particular, square, does the maximum percent dot gain lie at an area coverage of essentially 50%. However, when the screen dots are, for example, circular, neighboring screen dots can overlap, and this can be effectively taken into account by the modified characteristic curve of printing having its maximum 42 above a 50% area coverage, and, in particular, in the range of between 50% and 70%, and, advantageously, at approximately 60% area coverage.

The maximum of the modified dot gain can be determined in the following way: Circular dots arranged like a checkerboard start to overlap at an area coverage of approximately 78% ($\pi/4 \cdot 100\%$). If one proceeds from a dot gain in the order of magnitude of between 10% and 25%, one then obtains at a maximum with approximately 60% area coverage with 25% dot gain an effective area coverage which lies at approximately 75% and thus close to the theoretical value of approximately 78% for the overlapping of exactly circular dots arranged like a checkerboard. Since, in practice, the printed dots are not exactly circular, very good results are obtained when the maximum 42 lies above a 50% area coverage, and, in particular, at approximately 60% area coverage.

In practice, very good reproduction results have been achieved with a modified characteristic curve of printing 30, i.e., high color fidelity of the image reproduction in the print has been obtained over the entire range of the area coverage.

The modified characteristic curve of printing 30, which, in particular, is a continuously differentiable curve, can be obtained in a simple way with a first arc of a circle 44 and a second arc of a circle 46 which are joined together in such a way as to produce a continuously differentiable transition. The different slopes at the zero crossings 34 and 36 can then also be set by the two different arcs of a circle 44, 46.

In the second embodiment 32 of a modified characteristic curve of printing, there is again a zero crossing at high area coverages which corresponds to the zero crossing 36 of the first embodiment 30. At low area coverages there is a zero crossing 48 which lies at approximately 23% area coverage. A corresponding tangent 50 at the zero crossing 48 again extends at a smaller acute angle to the abscissa than the tangent 40 at the zero crossing 36. In the case of the modified characteristic curve of printing 32, the modified dot gain is thus only set at a finite value from area coverages of approximately 23% on and then increases monotonically towards the maximum 42.

In comparison with the modified characteristic curve of printing 30, the modified dot gain is even further reduced at low area coverages in the characteristic curve of printing 32, i.e., the dot gain is not taken into account at low area coverages up to the zero crossing 48 in the characteristic curve of printing, and up to the zero crossing 48 one then proceeds from the ideal characteristic curve of printing.

The invention is based on the recognition that it is in the ranges of low area coverage at a sufficient distance from zero area coverage and in the ranges of high area coverage at a sufficient distance from 100% area coverage that the effect of the dot gain on the color fidelity is most disturbing, and, consequently, it is here that a calculated compensation for the dot gain is most necessary. Such a compensation can be achieved in a simple way by predefining in accordance with the invention a corresponding characteristic curve of printing in relation to the ideal characteristic curve of printing, and this has yielded very good results for the color fidelity.

In particular, a modified maximum dot gain which is a predefined value which need not necessarily correspond to an actual dot gain is set. In practice, very good reproduction results have been obtained with a maximum modified dot gain in the range of approximately 10%.

Aside from the formation of the modified characteristic curve of printing by two arcs of a circle, other mathematical functions may be chosen to obtain a modified characteristic curve of printing, e.g., with arcs of a hyperbola, arcs of an ellipse or arcs of a parabola. Good reproduction results have been obtained when the zero crossings of the modified characteristic curve of printing lie outside of an area coverage of the plate of 0% and 100%.

The predefined modified characteristic curve of printing is used as mathematical function or via predefined values of the modified characteristic curve of printing, for example, within the framework of a color management system such as Adobe Photoshop (Adobe and Photoshop are registered trademarks of Adobe Systems Incorporated). Such color management systems, which are described in the publication "PHILOSOPHIE UND TECHNIK DES COLOR MANAGEMENT" cited at the outset, enable alteration of the image generated, for example, by a scanner, in any way and to any extent, by strengthening or weakening image elements of the individual color separations. Experimentally determined characteristic curves of printing are or can be filed in such programs.

In accordance with the invention, the modified characteristic curve of printing is filed in such a color management system in order to achieve compensation of the dot gain in the print. This means that on the basis of the predefined theoretical characteristic curve of printing, printing inks are applied to a corresponding lesser extent in the area coverage to take the dot squeezing into account so that the dot gain is set so as to substantially maintain the color fidelity.

In particular, a dot gain caused by a larger layer thickness of printing ink can be compensated in accordance with the invention. In DE 100 03 071 A1 and EP 1 120 445 A2, printing inks are described with which density ranges of more than 1.8 are achievable. Reference is made expressly to these documents. Larger density ranges also mean that an increased ink application occurs, which, in turn, brings about increased layer thickness and an increased dot gain. In particular, such overproportionally high dot gains can be compensated in accordance with the invention by predefining modified characteristic curves of printing with zero crossings of the dot gain outside zero area coverage and complete area coverage of the plate.

While various exemplary embodiments of the invention have been described, it will be apparent to those of ordinary skill in the art that many more embodiments and implementations are possible that are within the scope of this invention.

The invention claimed is:

1. Reproduction method for printing, wherein characteristic data of an original are transformed into data required for printing, comprising the steps of:
defining a modified characteristic curve of printing which in relation to an ideal characteristic curve of printing has a maximum above an area coverage of 50%; and
transforming the original data into said data required for printing using the modified characteristic curve in order to control dot gain in printing;
wherein the modified characteristic curve of printing in relation to the ideal characteristic curve of printing has a zero crossing at a finite area coverage.

2. Reproduction method for printing in accordance with claim 1, wherein the modified characteristic curve of printing in relation to the ideal characteristic curve of printing corresponds to a dependence of a modified dot gain on the area coverage.

3. Reproduction method for printing in accordance with claim 1, wherein the maximum of the modified characteristic curve of printing in relation to the ideal characteristic curve of printing lies at an area coverage of between 50% and 70%.

4. Reproduction method for printing in accordance with claim 1, wherein the maximum of the modified characteristic curve of printing in relation to the ideal characteristic curve of printing lies at approximately 60% area coverage.

5. Reproduction method for printing in accordance with claim 1, wherein the zero crossing of the modified characteristic curve of printing at low area coverage lies in a range of between 3% and 30% area coverage.

6. Reproduction method for printing in accordance with claim 1, wherein the zero crossing of the modified characteristic curve of printing at low area coverage lies in a range of between 5% and 25% area coverage.

7. Reproduction method for printing in accordance with claim 1, wherein the zero crossing of the modified characteristic curve of printing at high area coverage lies in a range of between 90% and 98% area coverage.

8. Reproduction method for printing in accordance with claim 1, wherein the zero crossing of the modified characteristic curve of printing at high area coverage lies in a range of between 95% and 98% area coverage.

9. Reproduction method for printing in accordance with claim 1, wherein the zero crossing of the modified characteristic curve of printing at low area coverage has a flatter slope than the zero crossing at high area coverage.

10. Reproduction method for printing in accordance with claim 9, wherein the slope of the zero crossing at low area coverage lies in a range of between 20° and 30°.

11. Reproduction method for printing in accordance with claim 9, wherein the slope of the zero crossing at high area coverage lies in a range of between 25° and 35°.

12. Reproduction method for printing in accordance with claim 1, wherein the maximum of the modified characteristic curve of printing is determined by a correlation of a theoretical area coverage and the dot gain.

13. Reproduction method for printing in accordance with claim 1, wherein the modified characteristic curve of printing is predefined by a mathematical function.

14. Reproduction method for printing in accordance with claim 1, wherein the modified characteristic curve of printing has in relation to the ideal characteristic curve of printing a maximum percent dot gain of less than 30%.

15. Reproduction method for printing in accordance with claim 14, wherein the maximum percent dot gain lies in a range of between 5% and 30%.

16. Reproduction method for printing in accordance with claim 15, wherein the maximum percent dot gain is approximately 10%.

17. Reproduction method for printing in accordance with claim 1, wherein a modified black color characteristic curve of printing is used for black.

18. Reproduction method for printing in accordance with claim 1, wherein a modified chromatic color tone characteristic curve of printing is used for the chromatic color tones.

19. Reproduction method for printing in accordance with claim 1, wherein the use of a printing ink with a lowest density will result in a standard print density of at least approximately 1.6.

20. Reproduction method for printing in accordance with claim 1, wherein a CMYK set of process colors is used for printing.

21. Reproduction method for printing in accordance with claim 1, wherein the use of a printing ink of a color tone yellow (Y) will result in a standard print density of approximately 2.0.

22. Reproduction method for printing in accordance with claim 1, wherein the use of a printing ink of a color tone magenta (M) will result in a standard print density of approximately 2.4.

23. Reproduction method for printing in accordance with claim 1, wherein the use of a printing ink of a color tone cyan (C) will result in a standard print density of approximately 2.5.

24. Reproduction method for printing in accordance with claim 1, wherein the use of a printing ink of a color tone black (K) will result in a standard print density of approximately 3.0.

25. Reproduction method for printing in accordance with claim 1, wherein the transformation from the original to printing data comprises a color space transformation from an RGB color space to a CMYK color space.

26. Reproduction method for printing in accordance with claim 1, wherein the printing is an offset printing process.

27. Reproduction method for printing in accordance with claim 1, wherein the modified characteristic curve of printing is entered in a color management system.

28. Reproduction method for printing wherein characteristic data of an original are transformed into data required for printing, comprising the steps of:

defining a modified characteristic curve of printing which in relation to an ideal characteristic curve of printing has a maximum above an area coverage of 50%; and transforming the original data into said data required for printing using the modified characteristic curve in order to control dot gain in printing;

wherein the modified characteristic curve of printing is predefined by a mathematical function comprising several arcs of a circle.

29. Reproduction method for printing in accordance with claim 28, wherein the predefined function comprises two arcs of a circle.

30. Reproduction method for printing in accordance with claim 28, wherein a position of a center point of a further circle forming one of the arcs of the circle is adjustable.

31. Reproduction method for printing in accordance with claim 28, wherein a radius of a further circle forming one of the arcs of the circle is adjustable.

32. Reproduction method for printing wherein characteristic data of an original are transformed into data required for printing, comprising the steps of:

defining a modified characteristic curve of printing which in relation to an ideal characteristic curve of printing has a maximum above an area coverage of 50%; and transforming the original data into said data required for printing using the modified characteristic curve in order to control dot gain in printing;

wherein the modified characteristic curve of printing is predefined by a mathematical function comprising one or several arcs of an ellipse, a parabola or a hyperbola.

33. Reproduction method for printing wherein characteristic data of an original are transformed into data required for printing, comprising the steps of:

defining a modified characteristic curve of printing which in relation to an ideal characteristic curve of printing has a maximum above an area coverage of 50%;

transforming the original data into said data required for printing using the modified characteristic curve in order to control dot gain in printing; and making a printing ink for said printing from a mixture of binder, colorant and printing additives, wherein a proportion of the colorant in said ink as a proportion of pigment is between 15% and 40%.

* * * * *